United States Patent
Kurimura

(10) Patent No.: US 10,099,287 B2
(45) Date of Patent: Oct. 16, 2018

(54) DYNAMIC PRESSURE BEARING AND METHOD FOR MANUFACTURING SAME

(71) Applicant: NTN CORPORATION, Osaka (JP)

(72) Inventor: Tetsuya Kurimura, Mie (JP)

(73) Assignee: NTN CORPORATION, Osaka (JP)

(*) Notice: Subject to any disclaimer, the term of this patent is extended or adjusted under 35 U.S.C. 154(b) by 0 days.

(21) Appl. No.: 15/528,599

(22) PCT Filed: Oct. 29, 2015

(86) PCT No.: PCT/JP2015/080562
§ 371 (c)(1),
(2) Date: May 22, 2017

(87) PCT Pub. No.: WO2016/084546
PCT Pub. Date: Jun. 2, 2016

(65) Prior Publication Data
US 2017/0266725 A1    Sep. 21, 2017

(30) Foreign Application Priority Data
Nov. 28, 2014 (JP) .................. 2014-241268

(51) Int. Cl.
*B22F 3/00* (2006.01)
*F16C 33/14* (2006.01)
(Continued)

(52) U.S. Cl.
CPC .............. *B22F 3/001* (2013.01); *B22F 3/004* (2013.01); *F16C 17/107* (2013.01); *F16C 33/10* (2013.01);
(Continued)

(58) Field of Classification Search
CPC ........ F16C 33/10; F16C 33/107; F16C 33/14; F16C 2220/20; F16C 2240/12;
(Continued)

(56) References Cited

U.S. PATENT DOCUMENTS 3,331,686 A * 7/1967 Bonis ................. B22F 3/12
419/28
6,358,298 B1 * 3/2002 Gagne ................ B22F 3/1028
419/11
(Continued)

FOREIGN PATENT DOCUMENTS

| JP | 2000-065065 | 3/2000 |
| JP | 2002241804 A * | 8/2002 |

(Continued)

OTHER PUBLICATIONS

International Search Report dated Dec. 8, 2015 in International (PCT) Application No. PCT/JP2015/080562.

*Primary Examiner* — Marcus Charles
(74) *Attorney, Agent, or Firm* — Wenderoth, Lind & Ponack, L.L.P.

(57) ABSTRACT

Dynamic pressure bearing (10), including: a green compact (10'), as a base material, of raw material powder including metal powder capable of forming an oxide coating; and dynamic pressure generating portions (A1 and A2) formed through die molding on an inner peripheral surface (8*a*) forming a radial bearing gap with an outer peripheral surface (2*a*1) of a shaft to be supported, that is, a shaft member (2). An oxide coating (11) is formed between particles of the metal powder by subjecting the green compact (10') to steam treatment, and the dynamic pressure bearing (10) has a radial crushing strength of 150 MPa or more.

9 Claims, 5 Drawing Sheets

(51) Int. Cl.
*F16C 33/10* (2006.01)
*F16C 17/10* (2006.01)
*B22F 3/03* (2006.01)
*H02K 5/16* (2006.01)

(52) U.S. Cl.
CPC ............ *F16C 33/107* (2013.01); *F16C 33/14* (2013.01); *F16C 33/145* (2013.01); *B22F 3/03* (2013.01); *B22F 2998/10* (2013.01); *B22F 2999/00* (2013.01); *F16C 33/104* (2013.01); *F16C 2240/12* (2013.01); *H02K 5/16* (2013.01)

(58) Field of Classification Search
CPC ...... B22F 3/001; B22F 3/004; B22F 2998/10; B22F 2999/00; B22F 3/03; C22C 38/16; H02K 5/16; H02K 7/085
USPC .... 384/100, 107, 114, 121, 279, 907.1, 910, 384/912; 419/11, 28, 35, 38, 48, 53, 2, 419/19, 27; 75/228, 255, 232
See application file for complete search history.

(56) References Cited

U.S. PATENT DOCUMENTS

| | | | |
|---|---|---|---|
| 2005/0259898 A1* | 11/2005 | Nii | F16C 17/02 384/100 |
| 2006/0088234 A1* | 4/2006 | Nii | F16C 17/045 384/121 |
| 2007/0092171 A1 | 4/2007 | Asada et al. | |
| 2007/0212248 A1* | 9/2007 | Nii | B22F 3/24 419/28 |
| 2010/0310199 A1* | 12/2010 | Okamura | B22F 3/164 384/114 |
| 2012/0027635 A1 | 2/2012 | Takezaki et al. | |
| 2013/0071054 A1* | 3/2013 | Harada | F16C 33/1065 384/107 |
| 2013/0336604 A1* | 12/2013 | Noda | F16C 32/0633 384/107 |
| 2014/0234152 A1* | 8/2014 | Ito | B22F 1/0003 419/11 |
| 2015/0285300 A1* | 10/2015 | Ito | C22C 38/16 384/279 |

FOREIGN PATENT DOCUMENTS

| | | | | |
|---|---|---|---|---|
| JP | 2003096502 A | * | 4/2003 | |
| JP | 3607661 | | 1/2005 | |
| JP | 2007-57068 | | 3/2007 | |
| JP | 2007-113728 | | 5/2007 | |
| JP | 2007-154959 | | 6/2007 | |
| JP | 2012-31965 | | 2/2012 | |
| JP | 2016141815 A | * | 8/2016 | |
| WO | WO-2009154052 A1 | * | 12/2009 | ............. B22F 5/106 |
| WO | WO-2014156856 A1 | * | 10/2014 | ............... B06B 1/16 |

* cited by examiner

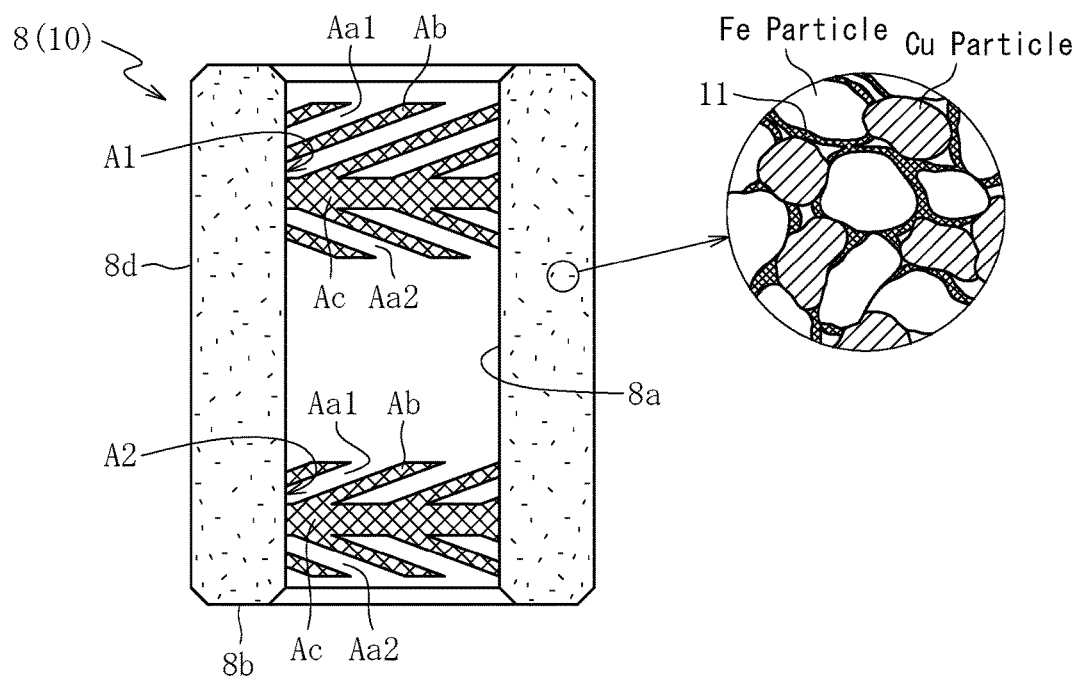
FIG. 3
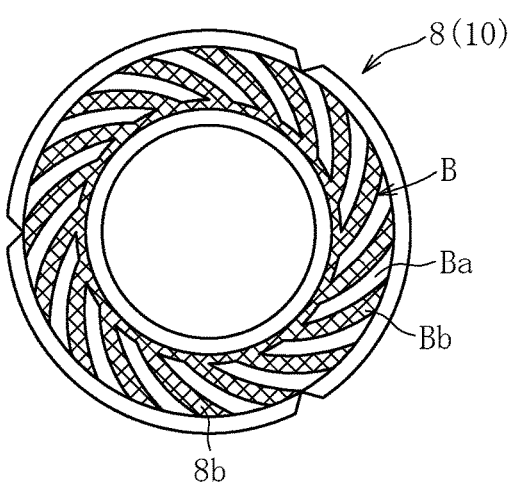

DYNAMIC PRESSURE BEARING AND METHOD FOR MANUFACTURING SAME

CROSS REFERENCE TO RELATED APPLICATIONS

The present application is a U.S. National Stage Application of International (PCT) Application No. PCT/JP2015/080562 filed on Oct. 29, 2015.

TECHNICAL FIELD

The present invention relates to a dynamic pressure bearing and a method of manufacturing the dynamic pressure bearing. More particularly, the present invention relates to a dynamic pressure bearing comprising a green compact as a base material and a method of manufacturing the dynamic pressure bearing.

BACKGROUND ART

As is well known, a dynamic pressure bearing has a dynamic pressure generating portion configured to cause a dynamic pressure action in lubricating fluid such as lubricating oil which is provided in a bearing gap formed with a shaft to be supported. As the dynamic pressure bearing, there have been known a dynamic pressure bearing configured to support only a radial load, a dynamic pressure bearing configured to support only a thrust load, and a dynamic pressure bearing configured to support both the radial load and the thrust load. The dynamic pressure bearing configured to support the radial load has a dynamic pressure generating portion, specifically, a radial dynamic pressure generating portion on an inner peripheral surface thereof. The dynamic pressure bearing configured to support the thrust load has a dynamic pressure generating portion, specifically, a thrust dynamic pressure generating portion on an end surface thereof.

For example, in Patent Literature 1 described below, there is disclosed a procedure of manufacturing the dynamic pressure bearing configured to support the radial load among the various types of dynamic pressure bearings. Specifically, a green compact of raw material powder, which includes metal powder as a main raw material, is formed through compression molding, and at the same time, a dynamic pressure generating portion is formed on an inner peripheral surface of the green compact through die molding. After that, a sintering step of sintering the green compact to obtain a sintered compact and a dimension correcting step of correcting a dimension of the sintered compact are performed. With the above-mentioned procedure, there is no need to provide a separate die which is required when the dynamic pressure generating portion is formed on the sintered compact through die molding (for example, Patent Literature 2) in the dimension correcting step (shaping step) or the like without forming the dynamic pressure generating portion on the green compact through die molding. Thus, there is an advantage in that the dynamic pressure bearing can be manufactured at low cost. The dynamic pressure bearing configured to support the thrust load and the dynamic pressure bearing configured to support both the radial load and the thrust load can also be manufactured through the procedure similar to that of Patent Literature 1.

CITATION LIST

Patent Literature 1: JP 2000-65065 A
Patent Literature 2: JP 3607661 B2

SUMMARY OF INVENTION

Technical Problem

Incidentally, the sintering step is performed for the primary purpose of securing a strength required for use as the dynamic pressure bearing. In the sintering step, the green compact is typically heated at 800° C. or more. Accordingly, in the sintered compact which is obtained through the sintering step, degradation in dimension accuracy of portions of the sintered compact is liable to occur due to thermal compression or the like after sintering. Thus, in order to secure the dimension accuracy of portions of the sintered compact which is required for use as the dynamic pressure bearing, it is essential to perform dimension correcting processing (shaping processing) such as sizing to the sintered compact. Conversely, when a strength of the green compact which is sufficient for direct use as the dynamic pressure bearing can be secured, the sintering step and the subsequent shaping step can be omitted, thereby being capable of significantly reducing the manufacturing cost for the dynamic pressure bearing.

When a pressing force (molding pressure) of a pressing device (molding die device) is increased to compress the raw material powder to a high density, the strength of the green compact can be increased. Further, when the green compact is directly used as the dynamic pressure bearing, degradation in rigidity of a fluid coating formed in the bearing gap (so-called pressure release) is prevented as much as possible, thereby stably exerting desired bearing performance. However, it is not practical to rely only on the compression by the pressing device to increase the strength of the green compact to a level of enabling the use of the green compact as the dynamic pressure bearing. In the first place, the green compact is a product which is obtained by merely pressing and hardening the raw material powder. Thus, in consideration of operatability and mountability to another member, even when the green compact is molded to a high density, there is difficulty in direct use of the green compact as the dynamic pressure bearing.

In view of the above-mentioned actual circumstances, the present invention has an object to provide a dynamic pressure bearing which can be manufactured at relatively low cost, has a sufficient strength durable for actual use, and can stably exert the desired bearing performance.

Solution to Problem

According to a first aspect of the present invention which has been devised to solve the above-mentioned problems, there is provided a dynamic pressure bearing, comprising: a green compact, as a base material, of raw material powder including metal powder capable of forming an oxide coating; and a dynamic pressure generating portion formed through die molding on a surface forming a bearing gap with a shaft to be supported, wherein the oxide coating is formed between particles of the metal powder by subjecting the green compact to steam treatment, and the dynamic pressure bearing has a radial crushing strength of 150 MPa or more.

Further, according to a second aspect of the present invention which has been devised to solve the above-mentioned problems, there is provided a method of manufacturing a dynamic pressure bearing, which has a radial crushing strength of 150 MPa or more, the method comprising: a compression molding step of compressing raw material powder including metal powder capable of forming an oxide coating to obtain a green compact having the dynamic pressure generating portion formed through die molding on the surface forming the bearing gap with the shaft to be supported; and a steam treatment step of subjecting the green compact to steam treatment to form an oxide coating between particles of the metal powder constructing the green compact.

The "metal powder capable of forming an oxide coating" according to the present invention is, in other words, powder of metal having high ionization tendency. For example, powder of iron, aluminum, magnesium, or chromium, or alloy powder including the above-mentioned metal may be employed. The metal powder capable of forming an oxide coating may be used alone or in combination thereof. Further, the "bearing gap" is a matter which includes at least one of the radial bearing gap and the thrust bearing gap. Thus, the present invention is applicable to any of a dynamic pressure bearing configured to support the radial load, a dynamic pressure bearing configured to support the thrust load, and a dynamic pressure bearing configured to support both the radial load and the thrust load. Further, the "dynamic pressure generating portion" may be any dynamic pressure generating portion which may cause the dynamic pressure action in the lubricating fluid such as the lubricating oil interposed in the bearing gap. For example, the dynamic pressure generating portion may have a plurality of dynamic pressure generating grooves arranged in a herringbone shape or in a spiral shape. Further, the "radial crushing strength" is a value which is calculated based on a method defined in JIS Z 2507.

The steam treatment employed in the present invention is treatment of causing the green compact of the raw material powder, which includes the metal powder capable of forming an oxide coating, to react with water vapor while heating the green compact to a predetermined temperature, for example, in a range of from 400° C. to 550° C. in an oxidizing atmosphere to thereby form or generate the oxide coating between particles of the metal powder, that is, on surfaces of the particles of the metal powder. When iron powder is employed as the above-mentioned metal powder, the oxide coating is a coating of triiron tetraoxide ($Fe_3O_4$). The oxide coating formed between the particles of the metal powder functions as a coupling medium for the particles to replace a role of necking which is formed when the green compact is sintered. Thus, the strength of the green compact can be increased to a level of enabling direct use of the green compact as the dynamic pressure bearing, specifically, to a level having a radial crushing strength of 150 MPa or more. Further, the oxide coating formed between the particles of the metal powder reduces the sizes of inner pores of the green compact, thereby reducing porosity of the green compact. Thus, the degradation in rigidity of a fluid film formed in the bearing gap is prevented as much as possible, thereby being capable of achieving the dynamic pressure bearing stably exerting desired bearing performance.

Further, the steam treatment to be applied to the green compact involves a treatment temperature which is remarkably lower than a heating temperature for the case of sintering the green compact, thereby being capable of reducing the amount of change in dimension of a work piece after the treatment. Thus, shaping processing such as sizing, which is essential after the sintering step when the green compact is sintered, can be omitted. Further, when the amount of change in dimension can be reduced, a molding die for the green compact can easily be designed. Further, when the treatment temperature is low, energy required at the time of treatment can be reduced, thereby reducing a treatment cost. As described above, according to the present invention, there can be provided, at low cost, a dynamic pressure bearing which has a sufficient strength durable for actual use and which can stably exert the desired bearing performance.

In the dynamic pressure bearing according to the present invention, when a relative density of the green compact being a base material of the dynamic pressure bearing is excessively high, there is difficulty in allowing water vapor to enter a core portion of the green compact at the time of the steam treatment. Thus, there is a fear in that it becomes difficult to form the oxide coating which contributes to improvement in strength of the green compact in the core portion of the green compact. Further, there is also a fear in that a significant change in dimension occurs along with the steam treatment and that the amount of lubricating oil which may be held in the inner pores of the dynamic pressure bearing, that is, an oil-holding amount of the dynamic pressure bearing is reduced. Conversely, when the relative density of the green compact is excessively low, there is a fear in that the operatability of the green compact is degraded and that an inter-particle distance of the metal powder is increased to cause difficulty in formation of the oxide coating in a predetermined form. Thus, it is preferred that the relative density of the green compact be 80% or more and 88% or less. The "relative density" as used herein is also referred to as "true density ratio," and is calculated with the following relational expression.

Relative Density=(Density of Entire Green Compact/ True Density)×100[%]

The "true density" in the expression above corresponds to a theoretical density of a material which has no pore in a material, such as an ingot material. The "density of entire green compact" can be measured, for example, by a method defined in JIS 22501.

It is preferred that the green compact be a green compact of raw material powder which is obtained by mixing copper powder and iron powder being the metal powder capable of forming an oxide coating. When the green compact includes copper powder, the sliding characteristic of a surface forming the bearing gap, that is, a bearing surface can be enhanced. Meanwhile, through employment of the iron powder, which is less expensive and is excellent in availability, as the metal powder, increase in cost for the dynamic pressure bearing can be prevented. In this case, for example, when more importance is set on the cost and strength, a blend ratio of the iron powder may be set higher than that of the copper powder. When more importance is set on the sliding characteristic of the bearing surface, the blend ratio of the copper powder may be set higher than that of the iron powder.

When the green compact is subjected to the steam treatment for 20 minutes or more, the required strength for the dynamic pressure bearing, that is, the radial crushing strength of 150 MPa or more can be secured. Meanwhile, a longer treatment time of subjecting the steam treatment to the green compact does not always cause development in generation of the oxide coating to improve the strength of the green compact. When a predetermined treatment time elapses, generation of the oxide coating stops, and the effect of improving the strength of the green compact is saturated. Further, as the treatment time for the steam treatment becomes longer, not only the cost required for the steam treatment but also the manufacturing cost for the dynamic pressure bearing increases. Thus, it is preferred that the treatment time for the steam treatment be set to 20 minutes or more and 60 minutes or less.

The dynamic pressure bearing according to the present invention can be used in a state of being impregnated with the lubricating oil, that is, can be used as an oil-impregnated dynamic pressure bearing.

Further, the dynamic pressure bearing according to the present invention can be manufactured at low cost, has a sufficient strength durable for actual use, and can stably exert the desired bearing performance. Thus, the dynamic pressure bearing and a shaft member which rotates relative to the dynamic pressure bearing can construct a fluid dynamic pressure bearing configured to support the shaft member so as to be rotatable relative to the dynamic pressure bearing in a non-contact manner. The fluid dynamic pressure bearing device can be suitably used through incorporation to various motors such as a fan motor for a PC and a spindle motor for a disc drive device, and can contribute to reduction in cost for various motors.

Advantageous Effects of Invention

As described above, according to the present invention, it is possible to provide the dynamic pressure bearing which can be manufactured at low cost, has the sufficient strength durable for actual use, and can stably exert the desired bearing performance.

BRIEF DESCRIPTION OF DRAWINGS

FIG. 2 is a sectional view of the dynamic pressure bearing illustrated in FIG. 1.

FIG. 3 is a plan view for illustrating a lower end surface of the dynamic pressure bearing illustrated in FIG. 1.

DESCRIPTION OF EMBODIMENTS

Now, description is made of an embodiment of the present invention with reference to the drawings.

Figure 1:
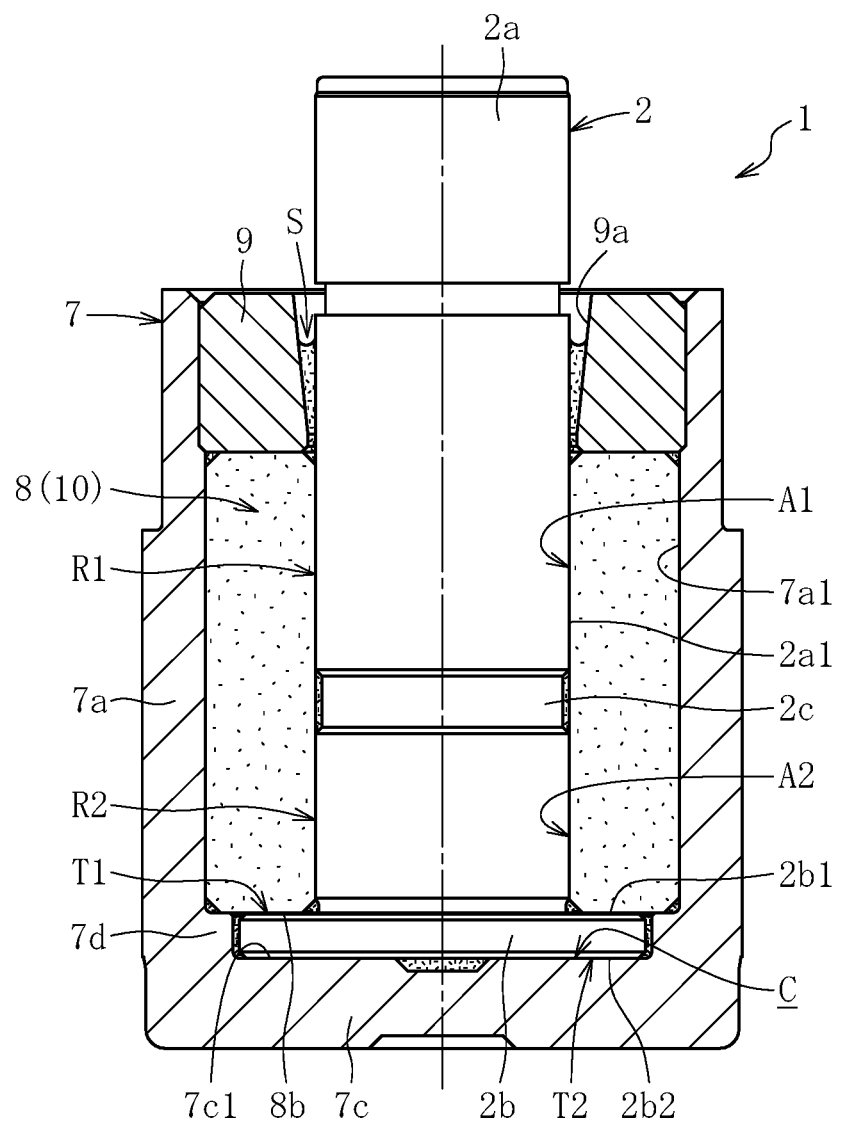
FIG. 1 is a sectional view for illustrating an example of a fluid dynamic pressure bearing device which includes a dynamic pressure bearing according to an embodiment of the present invention as a component.

FIG. 1 is a view for illustrating an example of a fluid dynamic pressure bearing device which comprises a dynamic pressure bearing 10 according to one embodiment of the present invention as a component, that is, uses the dynamic pressure bearing 10 as a bearing sleeve 8. The fluid dynamic pressure bearing device 1 illustrated in FIG. 1 comprises the bearing sleeve 8 (dynamic pressure bearing 10), a shaft member 2 which is inserted along an inner periphery of the bearing sleeve 8 and rotates relative to the bearing sleeve 8, a housing 7 which holds the bearing sleeve 8 along an inner periphery thereof and has a bottomed cylindrical shape, and a sealing member 9 configured to seal an opening of the housing 7. An internal space of the housing 7 is filled with lubricating oil, which is illustrated with dense dot hatching, being lubricating fluid. In the following, for convenience, description is made with the following definitions of sides. That is, a side on which the sealing member 9 is arranged is an upper side, and an opposite side in an axial direction is a lower side.

The housing 7 has a bottomed cylindrical shape which integrally includes a cylindrical portion 7a having a cylindrical shape and a bottom portion 7c closing a lower end opening of the cylindrical portion 7a. A step portion 7d is formed at a boundary portion between the cylindrical portion 7a and the bottom portion 7c. A lower end surface 8b of the bearing sleeve 8 is brought into abutment against an upper end surface of the step portion 7d so that a relative position of the bearing sleeve 8 with respect to the housing 7 in the axial direction is determined.

At an inner bottom surface 7c1 of the bottom portion 7c, there is provided a thrust bearing surface having an annular shape which forms, at the time of relative rotation of the shaft member 2 and the bearing sleeve 8, a thrust bearing gap of a thrust bearing portion T2 with a lower end surface 2b2 of a flange portion 2b of the opposed shaft member 2. In this thrust bearing surface, there is formed a dynamic pressure generating portion, specifically, a thrust dynamic pressure generating portion C which is configured to cause a dynamic pressure action in the lubricating oil in the thrust bearing gap of the thrust bearing portion T2. Although not shown in the drawings, the thrust dynamic pressure generating portion is constructed so that, similarly to a thrust dynamic pressure generating portion B described later, for example, dynamic pressure generating grooves having a spiral shape and protruding ridge portions which divide the dynamic pressure generating grooves are arranged alternately in a circumferential direction.

The sealing member 9 is formed into an annular shape and is fixed by a suitable member to an inner peripheral surface 7a1 of the cylindrical portion 7a of the housing 7. An inner peripheral surface 9a of the sealing member 9 is formed into a tapered surface shape which is gradually reduced in diameter downward, to thereby form a sealing space S with an opposed outer peripheral surface 2a1 of the shaft member 2 which is gradually reduced in radial dimension downward. The sealing space S has a buffering function of absorbing the amount of change in volume of the lubricating oil filled in the internal space of the housing 7 due to a temperature change, and is configured to always maintain an oil level of the lubricating oil within a range of the sealing space S in the axial direction in an expected range of the temperature change.

The shaft member 2 comprises a shaft portion 2a and the flange portion 2b which is formed integrally with or separately from a lower end of the shaft portion 2a. A portion of the outer peripheral surface 2a1 of the shaft portion 2a, which is opposed to an inner peripheral surface 8a of the bearing sleeve 8, is formed into a smooth cylindrical surface having no protrusion or recess except for an inner recess portion 2c which is relatively small in diameter and has a cylindrical surface shape. Further, an upper end surface 2b1 and a lower end surface 2b2 of the flange portion 2b are formed into smooth flat surfaces.

The bearing sleeve 8 has a cylindrical shape and is fixed to an inner peripheral surface of the housing 7 by a suitable member. The inner peripheral surface 8a of the bearing sleeve 8 has cylindrical radial bearing surfaces, which form a radial bearing gap of the radial bearing portions R1 and R2 with the opposed outer peripheral surface 2a1 of the shaft portion 2a during relative rotation of the shaft member 2 and the bearing sleeve 8 and are arranged apart at two locations in an axial direction. As illustrated in FIG. 2, the two radial bearing surfaces have radial dynamic pressure generating portions A1 and A2, which are configured to cause the dynamic pressure action in the lubricating oil in the radial bearing gap, respectively. Each of the radial dynamic pressure generating portions A1 and A2 of the illustrated example has a plurality of upper dynamic pressure generating grooves Aa1 which are inclined with respect to the axial direction, a plurality of lower dynamic pressure generating grooves Aa2 which are inclined in a direction opposite to the upper dynamic pressure generating groove Aa1, and a protruding ridge portion which divides the dynamic pressure generating grooves Aa1 and Aa2. The dynamic pressure generating grooves Aa1 and Aa2 are formed into a herringbone shape as a whole. The ridge portion includes inclined ridge portions Ab and an annular ridge portion Ac. Each of the inclined ridge portions Ab is formed between dynamic pressure generating grooves which are adjacent to each other in a circumferential direction. The annular ridge portion Ac is formed between the upper and lower dynamic pressure generating grooves Aa1 and Aa2 and has a diameter substantially equal to that of the inclined ridge portion Ab.

The lower end surface 8b of the bearing sleeve 8 has an annular thrust bearing surface, which forms a thrust bearing gap of the thrust bearing portion T1 with the opposed upper end surface 2b1 of the flange portion 2b during relative rotation of the shaft member 2 and the bearing sleeve 8. As illustrated in FIG. 3, the thrust bearing surface has the dynamic pressure generating portion (thrust dynamic pressure generating portion) B which is configured to cause the dynamic pressure action in the lubricating oil in the thrust bearing gap of the thrust bearing portion T1. In the thrust dynamic pressure generating portion B of the illustrated example, dynamic pressure generating grooves Ba having a spiral shape and protruding ridge portions Bb dividing the dynamic pressure generating grooves Ba are arranged alternately in the circumferential direction.

In the fluid dynamic pressure bearing device 1 having the above-mentioned configuration, when the shaft member 2 and the bearing sleeve 8 are rotated relative to each other, the radial bearing gaps are formed between the two radial bearing surfaces formed on the inner peripheral surface 8a of the bearing sleeve 8 and the outer peripheral surface 2a1 of the shaft portion 2a opposed thereto. Along with the relative rotation of the shaft member 2 and the bearing sleeve 8, a pressure of oil films formed in both radial bearing gaps is increased by the dynamic pressure action of the radial dynamic pressure generating portions A1 and A2, specifically, the dynamic pressure action of the dynamic pressure generating grooves Aa1 and Aa2. As a result, the radial bearing portions R1 and R2, which are configured to support the shaft member 2 in the radial direction so as to be relatively rotatable in a non-contact manner, are formed at two locations apart in the axial direction. At this time, the inner recess portion 2c formed in the outer peripheral surface 2a1 of the shaft portion 2a forms a lubricating oil reservoir having a cylindrical shape between the two radial bearing gaps. Therefore, a shortage of the oil film in the radial bearing gap, that is, degradation in bearing performance of the radial bearing portions R1 and R2 can be prevented as much as possible.

During the relative rotation of the shaft member 2 and the bearing sleeve 8, the radial bearing gaps of the radial bearing portions R1 and R2 are formed, and at the same time, thrust bearing gaps are formed between the thrust bearing surface B formed in the lower end surface 8b of the bearing sleeve 8 and the upper end surface 2b1 of the flange portion 2b opposed thereto, and between the inner bottom surface 7c1 of the bottom portion 7c of the housing 7 and the lower end surface 2b2 of the flange portion 2b opposed thereto. Along with the relative rotation of the shaft member 2 and the bearing sleeve 8, the pressure of the oil films formed in both thrust bearing gaps is increased by the dynamic pressure actions of the thrust dynamic pressure generating portions B and C. As a result, the thrust bearing portions T1 and T2 which are configured to support the shaft member 2 in one thrust direction and another thrust direction so as to be relatively rotatable in a non-contact manner.

Although not shown in the drawings, the fluid dynamic pressure bearing device 1 described above is used as a bearing device for motors such as (1) a spindle motor for a disc device, (2) a polygon scanner motor for a laser beam printer (LBP), or (3) a fan motor for a PC. In the case of the item (1), for example, a disc hub having a disc mounting surface is provided integrally with or separately from the shaft member 2. In the case of the item (2), for example, a polygon mirror is provided integrally with or separately from the shaft member 2. In the case of the item (3), for example, a fan having blades is provided integrally with or separately from the shaft member 2.

In the fluid dynamic pressure bearing device 1 described above, the dynamic pressure bearing 10 used as the bearing sleeve 8 has a distinctive configuration. In the following, a structure of the dynamic pressure bearing 10 and a method of manufacturing the dynamic pressure bearing 10 according to this embodiment are described in detail.

The dynamic pressure bearing 10 comprises a green compact, as a base material, of raw material powder including metal powder, which is iron powder herein, capable of forming an oxide coating and copper powder, and the relative density of the green compact is set to 80% or more and 88% or less. As schematically illustrated in the enlarged view of FIG. 2, the dynamic pressure bearing 10 comprising such a green compact as a base material has an oxide coating 11 which is formed between particles of the iron powder, that is, between Fe particles. More specifically, the oxide coating 11 is formed on a surface of each Fe particle, and adjacent Fe particles are coupled to each other. The dynamic pressure bearing 10 has a strength which is sufficient for incorporation and use in the fluid dynamic pressure bearing device 1. Specifically, the dynamic pressure bearing 10 has a radial crushing strength of 150 MPa or more. The dynamic pressure bearing 10 having such a configuration is manufactured mainly through a compression molding step, a steam treatment step, and an oil-impregnating step in the stated order. In the following, each step is described in detail.

[Compression Molding Step]

Figure 4A:
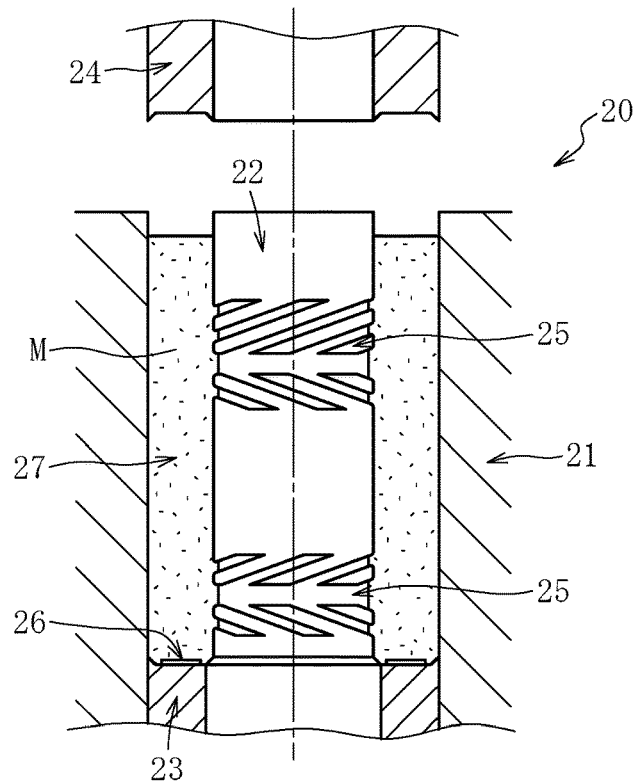
FIG. 4A is a view for schematically illustrating a compression molding step for a green compact, and is a view for illustrating an initial stage of the compression molding step.
Figure 4B:
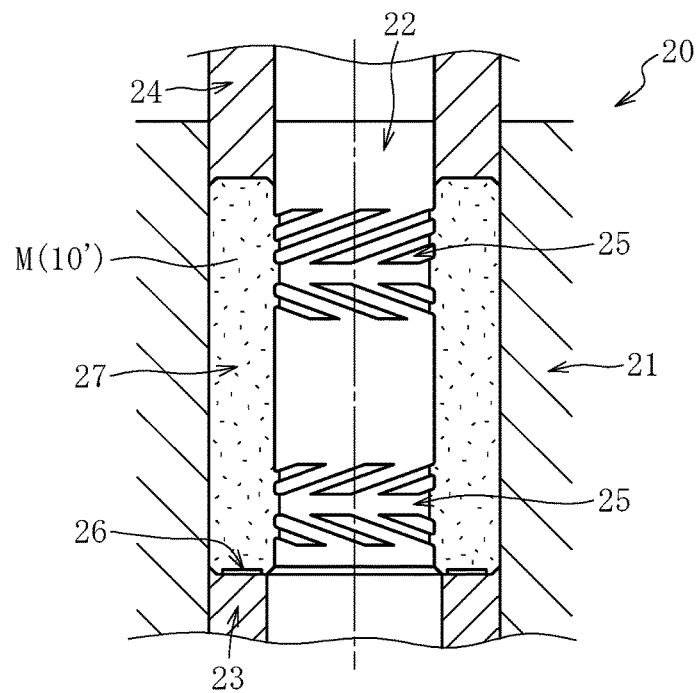
FIG. 4B is a view for illustrating a halfway stage of the compression molding step for the green compact.

In the compression molding step, raw material powder including the metal powder capable of forming an oxide coating is compressed to obtain a green compact 10' having the dynamic pressure generating portions. The dynamic pressure generating portions are formed through die molding on surfaces, which are an inner peripheral surface and one end surface herein, forming bearing gaps with a shaft to be supported, that is, the shaft member 2. The green compact 10' can be molded, for example, by a uniaxial press-molding method. Specifically, the green compact 10' can be obtained through use of a molding die device 20 as illustrated in FIG. 4A and FIG. 4B. The molding die device 20 comprises a die 21, a core pin 22, and a pair of lower punch 23 and upper punch 24. The die 21 has a cylindrical shape and is configured to mold an outer peripheral surface of the green compact 10'. The core pin 22 is arranged along an inner periphery of the die 21 and is configured to mold an inner peripheral surface of the green compact 10'. The pair of lower punch 23 and upper punch 24 are configured to mold one end surface (lower end surface) and another end surface (upper end surface) of the green compact 10'. The core pin 22, the lower punch 23, and the upper punch 24 are movable relative to each other with respect to the die 21 in the axial direction, that is, in an up-and-down direction. An outer peripheral surface of the core pin 22 has protrusion-and-recess die portions 25 and 25, which correspond to the shapes of the radial dynamic pressure generating portions A1 and A2 to be formed on the inner peripheral surface of the green compact 10', apart from each other in the up-and-down direction. An upper end surface of the lower punch 23 has a protrusion-and-recess die portion 26 which corresponds to the shape of the thrust dynamic pressure generating portion B to be formed on the lower end surface of the green compact 10'. In actuality, a level difference between the protrusion and the recess in each of the die portions 25 and 26 is from several micrometers to several tens of micrometers. However, illustration is given with exaggeration in FIG. 4A and FIG. 4B.

In the molding die device 20 having the above-mentioned configuration, as illustrated in FIG. 4A, the lower punch 23 is first lowered under a state in which the core pin 22 is arranged along an inner periphery of the die 21 to define a cavity 27 with the inner peripheral surface of the die 21, the outer peripheral surface of the core pin 22, and the upper end surface of the lower punch 23. Then, a raw material powder M is filled into the cavity 27. Herein, the raw material powder M of this embodiment is mixed powder obtained by mixing the iron powder being metal powder capable of forming an oxide coating, copper powder, and, for example, amide-wax-based solid lubricant powder. When the solid lubricant powder is included in the raw material powder M, a friction of powder particles and a friction between the powder and the die can be reduced, thereby being capable of improving moldability of the green compact 10'.

As the iron powder constructing the raw material powder M, there may be used, for example, reduced iron powder or atomized iron powder. Herein, the reduced iron powder being porous and excellent in oil-impregnation property is used. Further, as the copper powder, there may be used electrolytic copper powder, atomized copper powder, or the like. Herein, in consideration of flowability in the die and compression moldability, a mixture of the electrolytic copper powder and the atomized copper powder is used. The blend ratio of the iron powder and the copper powder in the raw material powder M can be suitably set depending on required characteristics. For example, the blend ratio may be set to iron powder by 40% and copper powder by 60% in mass ratio. When the blend ratio of the copper powder is set to be higher than that of the iron powder, slidability of the radial bearing surface and the thrust bearing surface of the dynamic pressure bearing 10 can be enhanced sufficiently. However, in order to secure the strength which is required for the dynamic pressure bearing 10, adjacent particles need to be coupled to each other through intermediation of the oxide coating 11 being a coating of triiron tetraoxide formed between Fe particles, that is, on the Fe particle surfaces. Therefore, it is preferred that the iron powder of at least 30% or more in mass ratio be blended.

Further, in consideration of cost and moldability of the green compact 10', it is preferred that iron powder having an average particle diameter of 20 μm or more and 100 μm or less be used. Further, in consideration of the flowability in the die and compression moldability, it is preferred that copper powder having an average particle diameter of 45 μm or less be used.

When the upper punch 24 is lowered as illustrated in FIG. 4B to compress the raw material powder M filled in the cavity 27 in the axial direction, the green compact 10' having a cylindrical shape is molded. At this time, the shape of the die portion 25 is transferred to the inner peripheral surface of the green compact 10', and the shape of the die portion 26 is transferred to the one end surface of the green compact 10'. With this, the green compact 10' having a cylindrical shape is formed through compression molding. At the same time, the radial dynamic pressure generating portions A1 and A2 are formed on the inner peripheral surface of the green compact 10', and the thrust dynamic pressure generating portion B is formed on the one end surface of the green compact 10' through die molding. Although not shown in the drawings, the upper punch 24, the lower punch 23, and the core pin 22 are raised after the molding of the green compact 10' to discharge the green compact 10' from the die 21. When the green compact 10' is discharged from the die 21, the inner peripheral surface and the outer peripheral surface of the green compact 10' are increased in diameter by so-called spring back. Thus, the state of engagement through the protrusions and recesses in the axial direction between the inner peripheral surface of the green compact 10' and the die portion 25 provided on the outer peripheral surface of the core pin 22 is released. With this, the core pin 22 can be drawn out from the inner periphery of the green compact 10' without breaking the shape of the radial dynamic pressure generating portions A1 and A2 formed through die molding on the inner peripheral surface of the green compact 10'.

Figure 5:
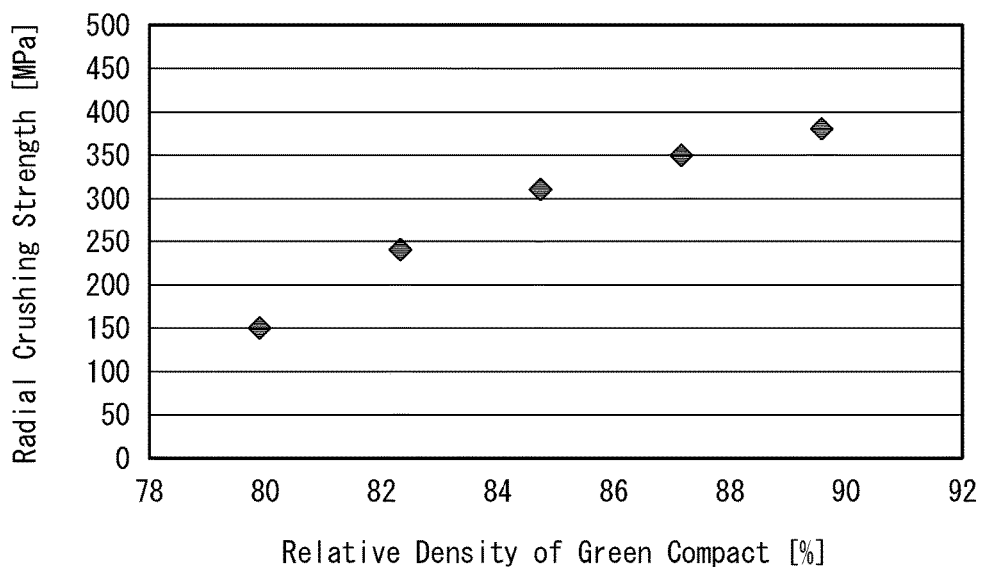
FIG. 5 is a graph for showing a correlation between a relative density and a radial crushing strength of the dynamic pressure bearing according to the present invention.

It has been found out that, when the relative density of the green compact 10' being the base material of the dynamic pressure bearing 10 is 80% or more, the strength required for the dynamic pressure bearing 10, that is, the radial crushing strength of 150 MPa or more can be secured (see FIG. 5). Therefore, even with the uniaxial press-molding method employed in this embodiment, the green compact 10' having a relative density of 80% or more can be reliably obtained. The uniaxial press-molding method has an advantage in that the green compact 10' can be obtained with less cost as compared to other press-molding methods such as molding through use of a multiaxial CNC press, a cold isostatic pressing method, and a hot isostatic pressing method which can be used to obtain the green compact 10'. As a matter of course, the molding through use of a multiaxial CNC press, the cold isostatic pressing method, the hot isostatic pressing method, and the like may be used in place of the uniaxial press-molding method to mold the green compact 10'.

[Steam Treatment Step]

In the steam treatment step, the green compact 10' is caused to react with water vapor while being heated for a predetermined time period within a temperature of from 400° C. to 550° C. in an oxidizing atmosphere. With this, the coating of triiron tetraoxide ($Fe_3O_4$) being the oxide coating 11 is gradually formed on the surfaces of the Fe particles constructing the green compact 10'. Along with the growth of the film, the dynamic pressure bearing 10 having adjacent particles coupled through intermediation of the oxide coating 11 can be obtained. The treatment time for the steam treatment is set to 20 minutes or more. This is because, when the steam treatment is performed for 20 minutes or more, the oxide coating 11 which may secure the strength required for the dynamic pressure bearing 10 can be formed in the green compact 10'. The longer treatment time for the steam treatment does not always improve the strength of the green compact 10' (dynamic pressure bearing 10). When a predetermined treatment time elapses, the growth of the oxide coating 11 stops, and the effect of improving the strength of the green compact 10' is saturated. Further, as the treatment time for the steam treatment becomes longer, the cost required for the steam treatment increases. Thus, the treatment time for the steam treatment is set to 20 minutes or more and 60 minutes or less.

In this embodiment, the raw material powder M including the solid lubricant powder is used as powder for molding the green compact 10'. Thus, it is preferred that a degreasing treatment be performed prior to the steam treatment to remove the solid lubricant powder included in the green compact 10'. This is for the purpose of promoting the growth of the oxide coating 11 and reliably obtaining the strength required for the dynamic pressure bearing 10, that is, the radial crushing strength of 150 MPa or more.

[Oil-Impregnating Step]

In this oil-impregnating step, the lubricating oil is impregnated by a method such as so-called vacuum impregnation into inner pores of the green compact 10' having the oxide coating 11, that is, the coating of triiron tetraoxide formed between adjacent particles. The oil-impregnating step is not always required, and may be performed only when the green compact 10' is used as so-called oil-impregnated dynamic pressure bearing.

As described above, the dynamic pressure bearing 10 according to this embodiment comprises the green compact 10' as the base material, and the green compact 10' is subjected to the steam treatment to obtain the coating of triiron tetraoxide as the oxide coating 11 formed between Fe particles and between Fe particles and Cu particles. This coating functions as a coupling medium for the particles constructing the green compact 10' to replace a role of necking which is formed when the green compact is sintered. Thus, the strength of the green compact 10' can be increased to the level of enabling direct use of the green compact 10' as the dynamic pressure bearing 10 (bearing sleeve 8), specifically, to a level having the radial crushing strength of 150 MPa or more.

Further, the presence of the oxide coating 11 reduces the sizes of the inner pores in the green compact 10', thereby reducing porosity of the green compact 10'. Thus, when the green compact 10' is used as the dynamic pressure bearing 10, the degradation in rigidity of the oil film formed in the radial bearing gap and in the thrust bearing gap is prevented as much as possible without irrelevant increase in density or relative density of the green compact 10' or without a separate sealing treatment. As a result, the fluid dynamic pressure bearing device 1 capable of stably exerting the desired bearing performance can be achieved.

Further, the steam treatment to be applied to the green compact 10' to form the oxide coating 11 involves a treatment temperature which is remarkably lower than a heating temperature for the case of sintering the green compact 10', thereby being capable of reducing the amount of change in dimension of the green compact 10' after the treatment. Specifically, in the case of the green compact 10' having the material composition employed in this embodiment, that is, the green compact 10' including Cu by 40 mass % and Fe by 60 mass %, the amount of change in dimension, which is herein the amount of contraction, of about 0.5% which may occur after sintering can be reduced to about 0.3% by the steam treatment. Thus, shaping processing such as sizing, which is essential after the sintering step when the green compact 10' is sintered, can be omitted. Further, when the amount of change in dimension can be reduced, the molding die device 20 configured to mold the green compact 10' can easily be designed. Further, when the treatment temperature is low, energy required at the time of treatment can be reduced, thereby being capable of reducing a treatment cost. As described above, according to the present invention, there can be provided, at low cost, the dynamic pressure bearing 10 which has a sufficient strength durable for actual use and which can stably exert the desired bearing performance.

Now, detailed description is made of verification tests which were conducted to verify that the dynamic pressure bearing 10 according to the present invention has a desired radial crushing strength and is capable of stably exerting the desired bearing performance. Before the verification tests were conducted, five types of green compacts 10' having different relative densities were prepared through adjustment of a pressing force or a molding pressure of the molding die device 20. Specifically, the green compacts 10' were prepared by subjecting the raw material powder M, which has a blend ratio including the iron powder by 40% and the copper powder by 60% in mass ratio, to the compression molding so that the relative densities thereof are set to approximately 80%, 82.3%, 84.7%, 87%, and 89.5%. After that, the green compacts 10' were subjected to the steam treatment under the conditions of 510° C. for 40 minutes, thereby obtaining the dynamic pressure bearings 10. First, the radial crushing strengths of the five types of dynamic pressure bearings 10 were measured. Results of the measurement are shown in FIG. 5. As is apparent from FIG. 5, when the green compact 10' having a relative density of 80% or more is subjected to the steam treatment, the radial crushing strength of 150 MPa or more required for the dynamic pressure bearing 10 can be secured.

Further, in order to evaluate the oil film formation performance, that is, the bearing performance of the dynamic pressure bearing 10 according to the present invention, the oil permeability for each of the above-mentioned five types of dynamic pressure bearings 10, which were experimentally prepared, was measured and calculated. Further, in order to clarify a degree of difference in oil film formation performance between the dynamic pressure bearing 10 according to the present invention and a general dynamic pressure bearing formed of a sintered compact, the oil permeability for each of the dynamic pressure bearings, that is, the dynamic pressure bearings formed of the sintered compact which are obtained by sintering the above-mentioned five types of green compacts 10' was also measured and calculated. A value of the oil permeability depends on a size of a test sample. Thus, the calculated oil permeability was used to calculate a permeability which may be used as a basis for determination of the oil film formation performance not depending on the size of the test sample.

Figure 7:
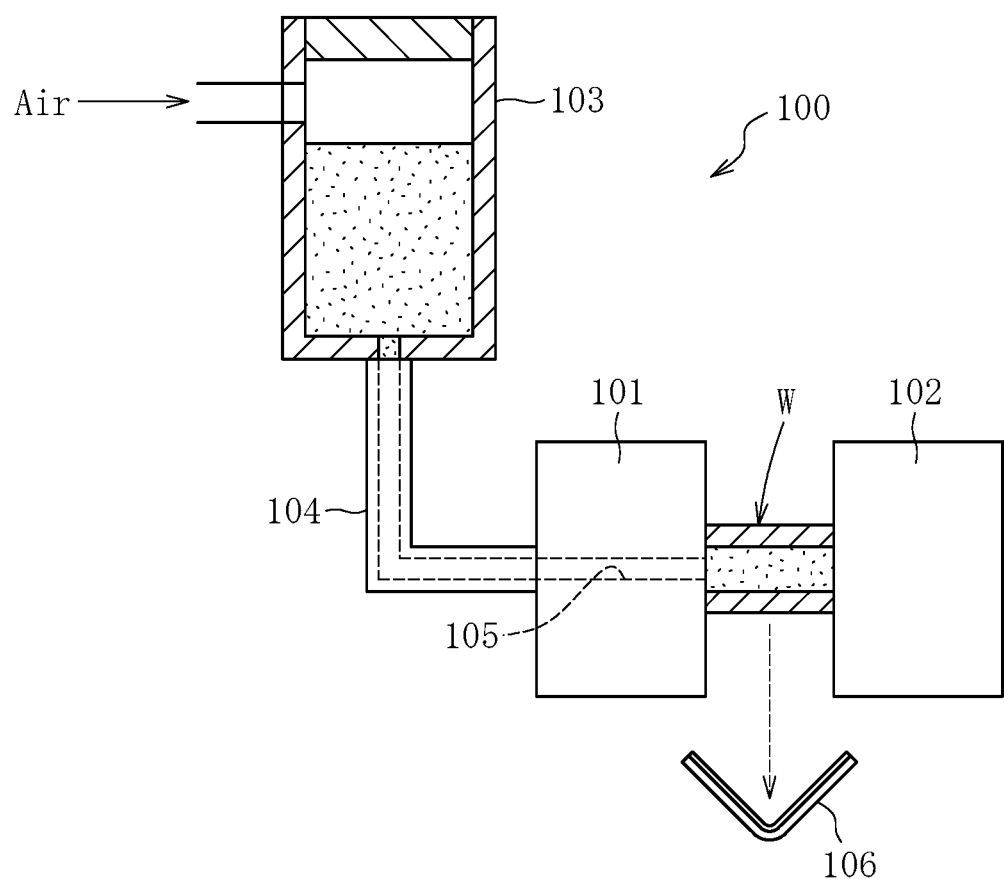
FIG. 7 is a view for schematically illustrating a device for measuring an oil permeability.

The above-mentioned "oil permeability" is a parameter [unit: g/10 min] which quantitatively indicates how much a porous work piece allows the lubricating oil to flow through its porous structure. The oil permeability can be measured through use of a test device 100 illustrated in FIG. 7. The test device 100 illustrated in FIG. 7 comprises holding portions 101 and 102 each having a cylindrical shape, a tank 103, and a pipe 104. The holding portions 101 and 102 are configured to sandwich and fix a test sample W having a cylindrical shape, which is herein the above-mentioned dynamic pressure bearing 10 or a sintered compact of the green compact 10', from both sides in the axial direction. The tank 103 is configured to store the oil. The pipe 104 is configured to feed the oil stored in the tank 103 to the holding portion 101. End portions of the test sample W in the axial direction and the holding portions 101 and 102 are sealed with a sealing member (not shown). In the configuration described above, a pressing force of 0.4 MPa is applied to the oil stored in the tank 103 under an environment of a room temperature of from 26° C. to 27° C., which is lubricating oil of the same kind as the lubricating oil filled in the internal space of the fluid dynamic pressure bearing device 1, and then the lubricating oil is continuously fed for 10 minutes to a through hole of the test sample W in the axial direction through an internal flow passage of the pipe 104 and an internal flow passage 105 of the holding portion 101. An oil-absorbing member 106 made of paper or cloth is arranged below the test sample W. When the lubricating oil is fed to the test sample W in the above-mentioned mode, the oil-absorbing member 106 collects oil which seeps through and drops from a surface opening formed in a radially outer surface of the test sample W. Then, the oil permeability is calculated based on a difference in weight of the oil-absorbing member 106 before and after the test.

Next, the above-mentioned "permeability" can also be referred to as a permeation amount [unit: m$^2$], and is calculated with the following relational expression.

$$K = -\frac{\mu}{2\pi L} \cdot \frac{l_n\left(\frac{r_1}{r_2}\right)}{\Delta p} \cdot q \quad [\text{Expression 1}]$$

In the relational expression described above, there are given K representing a permeability [m$^2$], μ representing an absolute viscosity [Pa·s] of lubricating oil, L representing an axial dimension [m] of a test sample, $r_1$ representing an inner diameter dimension [m] of the test sample, $r_2$ representing an outer diameter dimension [m] of the test sample, Δp representing a pressure difference [Pa], and q representing a volume flow rate [m$^3$/s]. The pressure difference Δp is Δp=0.4 MPa (0.4×10$^6$ Pa) in accordance with the steps of measuring the above-mentioned "oil permeability." The volume flow rate q is obtained by converting the oil permeability calculated through use of the above-mentioned test device 100.

Figure 6:
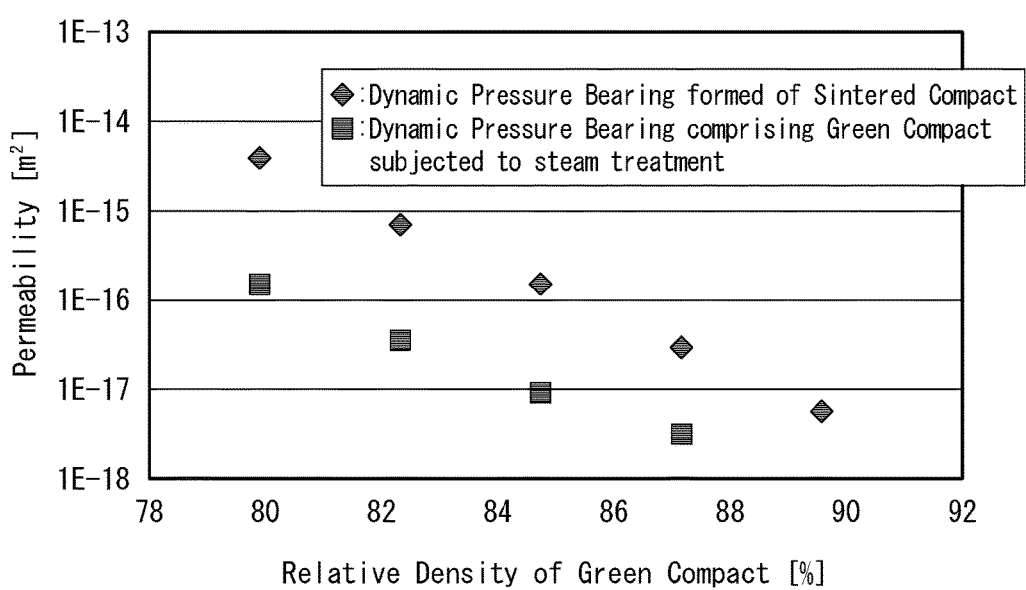
FIG. 6 is a graph for showing a correlation between a relative density and a permeability of the dynamic pressure bearing according to the present invention and a dynamic pressure bearing formed of a sintered compact.

In FIG. 6, there is shown the permeability of the above-mentioned five types of dynamic pressure bearings 10 and of the sintered compacts obtained by sintering the above-mentioned five types of green compacts 10'. The dynamic pressure bearing 10 having the green compact 10' with a relative density of 89.5% as the base material was omitted from FIG. 6 because a calculated permeability thereof was less than 1E$^{-18}$ [m$^2$]. As is apparent from FIG. 6, with the dynamic pressure bearing 10 according to the present invention which is obtained by subjecting the green compact 10' to the steam treatment, the oil film formation performance (bearing performance) which is equivalent to that of the case where the green compact 10' having a relative density smaller than the general dynamic pressure bearing obtained by sintering the green compact 10' by approximately 5% can be achieved.

Further, when the green compact 10' having a relative density of 80% or more is used as the base material, and the green compact 10' is subjected to the steam treatment, the strength and the oil film formation performance required for the dynamic pressure bearing 10 can be secured. However, when the relative density of the green compact 10' is increased to a degree of exceeding 88%, there is difficulty in allowing the water vapor to enter the core portion of the green compact during the steam treatment. As a result, the following disadvantages may arise. That is, it becomes more difficult to form the oxide coating, which contributes to improvement in strength of the green compact, in the core portion of the green compact. Along with the steam treatment, a significant change in dimension may occur. Further, the amount of the lubricating oil which may be held in the inner pores of the dynamic pressure bearing, that is, the oil-holding amount of the dynamic pressure bearing may become smaller. Thus, it is preferred that the relative density of the green compact 10' be set to 80% or more and 88% or less.

In the description above, the present invention is applied to the dynamic pressure bearing 10 configured to support the radial load and the thrust load (in a strict sense, the load in one thrust direction). However, the present invention may be suitably applied to the dynamic pressure bearing 10 configured to support only the radial load or to the dynamic pressure bearing 10 configured to support only the thrust load. Further, the mode of the radial dynamic pressure generating portions A1 and A2 is not particularly questioned as long as it causes the dynamic pressure action in the lubricating oil in the radial bearing gap. For example, the radial dynamic pressure generating portions A1 and A2 may be constructed by a multi-arc surface.

Further, as a matter of course, the fluid dynamic pressure bearing device which uses the dynamic pressure bearing 10 according to the present invention as a component is not limited to the fluid dynamic pressure bearing device 1 illustrated in FIG. 1.

REFERENCE SIGNS LIST 1 fluid dynamic pressure bearing device
2 shaft member (shaft to be supported)
2a shaft portion
2b flange portion
8 bearing sleeve
8a inner peripheral surface
8b lower end surface
9 sealing member
10 dynamic pressure bearing
11 oxide coating
20 molding die device
A1, A2 radial dynamic pressure generating portion (pressure generating portion)
B thrust dynamic pressure generating portion (pressure generating portion)
R1, R2 radial bearing portion
T1, T2 thrust bearing portion

The invention claimed is:
1. A dynamic pressure bearing, comprising:
  a green compact, as a base material, of raw material powder including metal powder capable of forming an oxide coating;
  the oxide coating; and
  a dynamic pressure generating portion formed through die molding on a surface forming a bearing gap with a shaft to be supported,
  wherein the oxide coating is formed between particles of the metal powder by subjecting the green compact to steam treatment, and the dynamic pressure bearing has a radial crushing strength of 150 MPa or more.

2. The dynamic pressure bearing according to claim 1, wherein a relative density of the green compact is 80% or more and 88% or less.

3. The dynamic pressure bearing according to claim 1, wherein the green compact comprises a green compact of raw material powder obtained by mixing copper powder and iron powder, which being the metal powder.

4. The dynamic pressure bearing according to claim 1, wherein lubricating oil is impregnated into inner pores of the green compact.

5. A fluid dynamic pressure bearing device, comprising:
the dynamic pressure bearing of claim 1; and
a shaft member which rotates relative to the dynamic pressure bearing.

6. The dynamic pressure bearing according to claim 2, wherein the green compact comprises a green compact of raw material powder obtained by mixing copper powder and iron powder, which being the metal powder.

7. A method of manufacturing a dynamic pressure bearing having a radial crushing strength of 150 MPa or more, the method comprising:

a compression molding step of compressing raw material powder including metal powder capable of forming an oxide coating to obtain a green compact having a dynamic pressure generating portion formed through die molding on a surface forming a bearing gap with a shaft to be supported; and a steam treatment step of subjecting the green compact to steam treatment to form an oxide coating between particles of the metal powder constructing the green compact.

8. The method of manufacturing a dynamic pressure bearing according to claim 7, wherein a treatment temperature of the steam treatment is set to 400° C. or more and 550° C. or less.

9. The method of manufacturing a dynamic pressure bearing according to claim 7, wherein a treatment time for the steam treatment is set to 20 minutes or more and 60 minutes or less.

* * * * *